United States Patent [19]

Sato

[11] Patent Number: 5,294,496
[45] Date of Patent: Mar. 15, 1994

[54] TERMINAL PROTECTION STRUCTURE FOR A BATTERY PACK AND AN ELECTRONIC APPARATUS TO BE LOADED THEREWITH

[75] Inventor: Yasuharu Sato, Tokyo, Japan

[73] Assignee: NEC Corporation, Tokyo, Japan

[21] Appl. No.: 889,992

[22] Filed: May 29, 1992

[30] Foreign Application Priority Data

May 31, 1991 [JP] Japan .................. 3-040048[U]

[51] Int. Cl.⁵ ............................................. H01M 2/06
[52] U.S. Cl. ........................................ 429/65; 429/99;
429/123; 429/178
[58] Field of Search ................. 429/65, 99, 123, 178

[56] References Cited

U.S. PATENT DOCUMENTS 4,515,872 5/1985 Okano ............................. 429/65
5,183,714 2/1993 Mitsui et al. .................... 429/123

Primary Examiner—Prince Willis, Jr.
Assistant Examiner—M. Nuzzolillo
Attorney, Agent, or Firm—Burns, Doane, Swecker & Mathis

[57] ABSTRACT

A structure for protecting connection terminals of a battery pack and connection terminals of an electronic apparatus to be loaded with the battery pack. The electronic apparatus and battery pack each has a terminal portion including a cover for protection. When the battery pack is removed from the apparatus, the cover of the former and the cover of the latter conceal and protect their associated connection terminals from accidents.

4 Claims, 4 Drawing Sheets

TERMINAL PROTECTION STRUCTURE FOR A BATTERY PACK AND AN ELECTRONIC APPARATUS TO BE LOADED THEREWITH

BACKGROUND OF THE INVENTION

The present invention relates to a structure for protecting connection terminals of a battery pack and connection terminals of an electronic apparatus to be loaded with the battery pack. More particularly, the present invention is concerned with a protection structure capable of securely protecting the connection terminals of a battery pack and those of an associated electronic apparatus when the former is removed from the latter.

A battery pack is extensively used with various kinds of electronic apparatuses, e.g., miniature portable radio apparatuses including a portable radio telephone and a radio pager, audio apparatuses including miniature radio and television sets, and portable office equipment including a personal computer and a word processor. When a battery pack is mounted on such an apparatus, its terminals are connected to the terminals of the apparatus to feed power to the apparatus. While this kind of conventional configuration securely connects the terminals of the battery pack and those of the apparatus, it does not give consideration to the protection of the terminals when uncovered due to the battery pack being removed from the apparatus. Therefore, it is likely that when the battery pack is handled carelessly outside the apparatus, some conductor will come in contact with its terminals causing a short circuit. Moreover, the terminals of the apparatus which are also bare are apt to suffer from damage.

SUMMARY OF THE INVENTION

It is therefore an object of the present invention to provide a protection structure capable of surely protecting the connection terminals of a battery pack and those of an apparatus to be powered thereby when the former is removed from the latter.

A structure for protecting the connection terminals of an electronic apparatus and the connection terminals of a battery pack to be removably mounted on the electronic apparatus of the present invention comprises a casing included in each of the electronic apparatus and battery pack, connection terminals affixed to each of the casings, and a cover included in each of the electronic apparatus and battery pack for protecting the connection terminals when the battery pack is removed from the electronic apparatus.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, a brief reference will be made to a conventional connection terminal protection structure, shown in FIGS. 1, 2A, 2B and 3.

Figure 1:
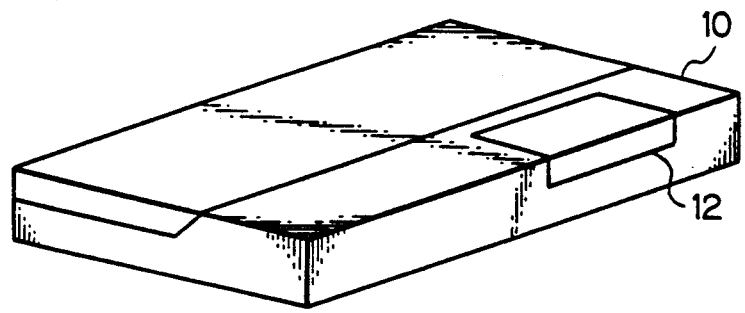
FIG. 1 is an external view of an electronic apparatus loaded with a battery pack.
Figure 2A:
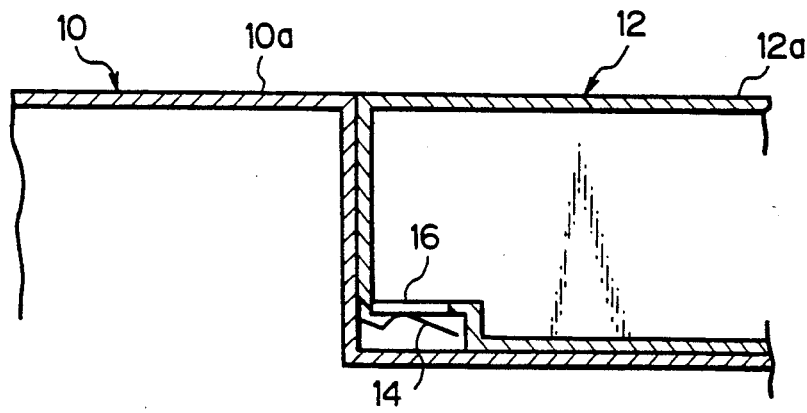
FIGS. 2A, 2B and 3 are sections showing the conventional configuration of terminal connecting portions included in the battery pack and electronic apparatus.
Figure 2B:
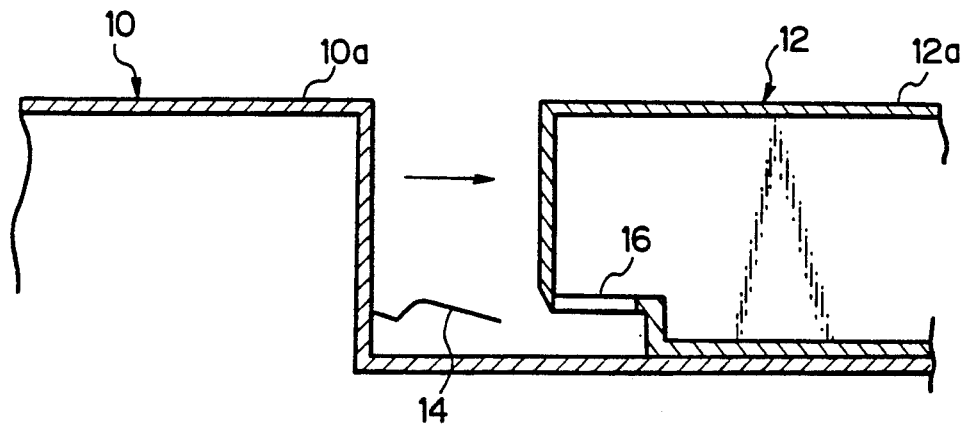
Figure 3:
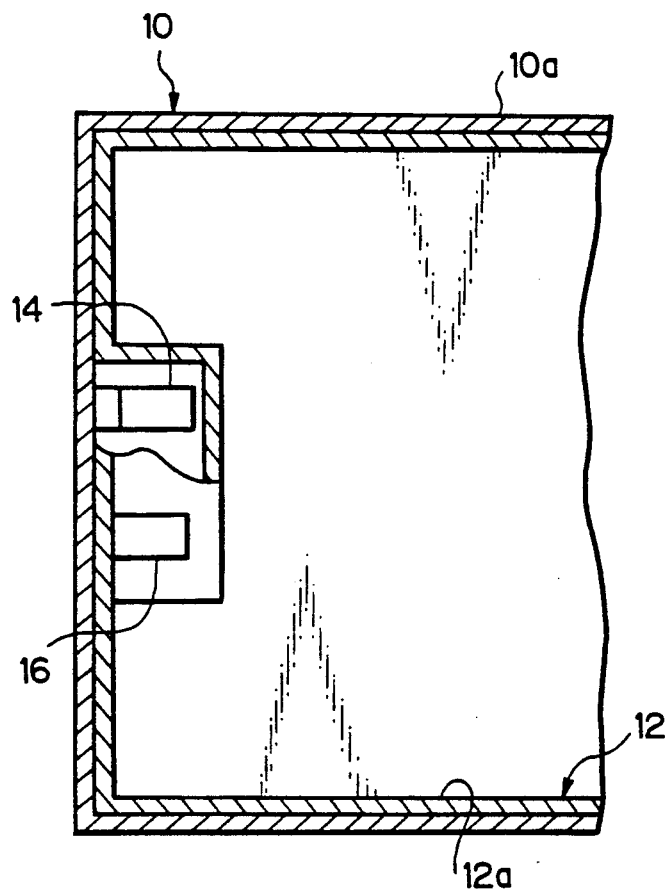

FIG. 1 shows a portable miniature personal computer or similar electronic apparatus 10 loaded with a battery pack 12 while FIGS. 2A, 2B and 3 show conventional terminal connecting portions included in the apparatus 10 and battery pack 12. As shown, the apparatus 10 has a casing 10a to which connection terminals 14 of opposite polarities are affixed. Likewise, the battery pack 12 has a casing 12a to which connection terminals 16 of opposite polarities are affixed. As FIGS. 2A and 3 indicate, when the battery pack 12 is mounted on the apparatus 10, the terminals 14 and 16 are connected together. On the other hand, when the battery pack 12 is removed from the apparatus 10, the terminals 14 and 16 are released from each other and uncovered, as shown in FIG. 2B. In this condition, some conductor is apt to contact the bare terminals 16 of the battery pack 12 to thereby cause short-circuiting. Further, it is likely that the uncovered terminals 14 of the apparatus 10 are deformed or otherwise damaged by an unexpected external force.

Figure 4A:
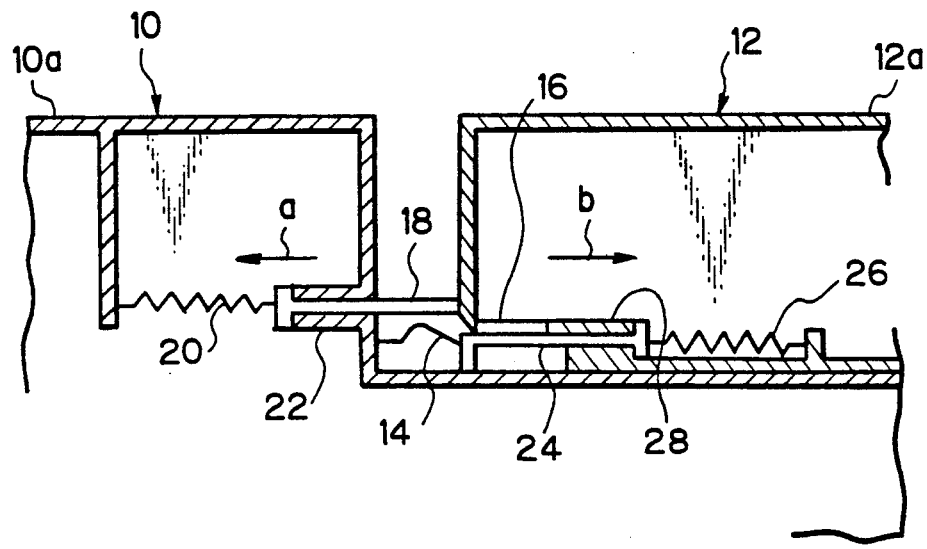
FIGS. 4A, 4B and 5 are sections showing a connection terminal protection structure for a battery pack and an electronic apparatus embodying the present invention.
Figure 4B:
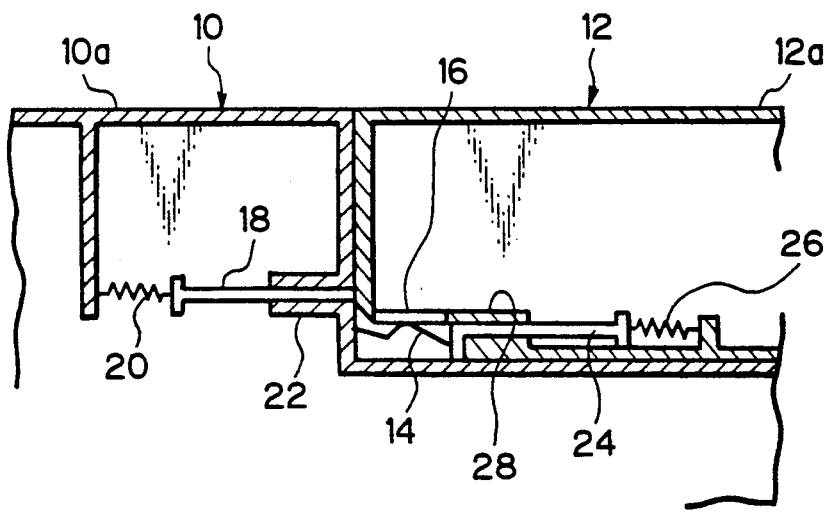
Figure 5:
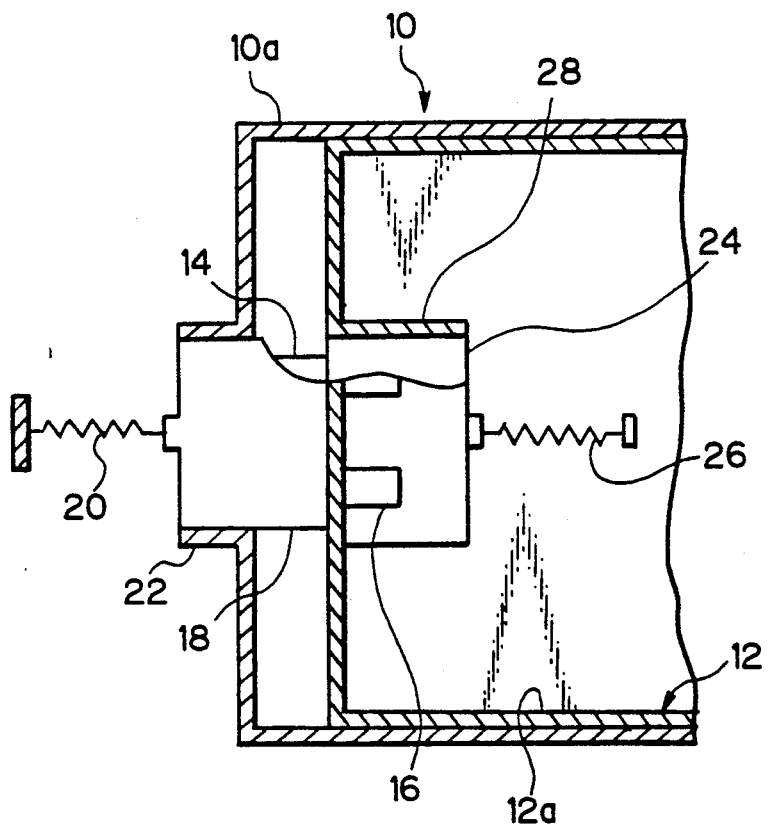

Referring to FIGS. 4A, 4B and 5, a connection terminal protection structure embodying the present invention is shown. In these figures, the same or similar constituent parts or elements to those of the conventional structure are designated by like reference numerals, and redundant description will be avoided for simplicity.

FIGS. 4A and 5 show an electronic apparatus 10 and a battery pack 12 which is not fully mounted on the apparatus 10 while FIG. 4B shows the former on which the latter is fully mounted. As shown, the apparatus 10 has a casing 10a including a terminal portion which is made up of terminals 14 of opposite polarities, a cover 18 for protecting the terminals 14, a spring 20 for pushing out the cover 18 when the battery pack 12 is removed, and a guide for guiding the cover 18. On the other hand, the battery pack 12 has a casing 12a including a terminal portion made up of terminals 16 of opposite polarities, a cover 24 for protecting the terminals 16, a spring 26 for pushing out the cover 24 when the battery pack 12 is removed, and a guide 28 for guiding the cover 24.

As shown in FIG. 4A, before the battery pack 12 is fully set in a predetermined position on the apparatus 10, the covers 18 and 24 conceal the connection terminals 14 and 16, respectively, by being forced out by the associated springs 20 and 26. As the battery pack 12 is moved in a direction indicated by an arrow a in FIG. 4A to be set in the predetermined position shown in FIG. 4B, it urges the cover 18 of the apparatus 10 in the direction a while having the cover 24 thereof urged in a direction b by the terminals 14 of the apparatus 10. As a result, as shown in FIG. 4B, the covers 18 and 24 are fully received in the casings 10a and 12a, respectively, and the terminals 14 and 16 are uncovered and connected together. When the battery pack 12 is moved in the direction b, FIG. 4A, to be removed from the apparatus 10, the covers 18 and 24 are forced out by the springs 20 and 26, respectively, and conceal the associated terminals 14 and 16.

In summary, in accordance with the present invention, an electronic apparatus and a battery pack to be removably mounted thereon each has a terminal portion including a cover for protection. When the battery pack is removed from the apparatus, the cover of the former and the cover of the latter conceal and protect their associated connection terminals from accidents.

Various modifications will become possible for those skilled in the art after receiving the teachings of the present disclosure without departing from the scope thereof.

What is claimed is:

1. A structure for protecting connection terminals of an electronic apparatus and connection terminals of a battery pack to be removably mounted on said electronic apparatus, said structure comprising:
   a casing included in said electronic apparatus;
   a casing included in said battery pack;
   a connection terminal affixed to said casing of said electronic apparatus;
   a connection terminal affixed to said casing of said battery pack;
   a cover included in said electronic apparatus for protecting said electronic apparatus connection terminal when said battery pack is not mounted to said electronic apparatus; and
   a cover included in said battery pack for protecting said battery pack connection terminal when said battery pack is not mounted to said electronic apparatus.

2. A structure as claimed in claim 1, wherein both said electronic apparatus and said battery pack further comprise a cover support and guide member for guiding the respective cover when said battery pack is moved into or out of said electronic apparatus.

3. A structure as claimed in claim 2, wherein both said electronic apparatus and said battery pack further comprise biasing members for causing the respective cover to move along the respective support and guide member when said battery pack is removed from said electronic apparatus, thereby protecting said connection terminals.

4. A structure as claimed in claim 3, wherein when said battery pack is mounted onto said electronic apparatus, said cover of said battery pack and said cover of said electronic apparatus are respectively urged by said casing of said electronic apparatus and said casing of said battery pack to move along the respective support and guide member.

* * * * *